UNITED STATES PATENT OFFICE.

TOMASZ MACHERSKI AND EDWARD KOPERSKI, OF BREST-LITOVSK, RUSSIA.

COMPOSITION FOR DECOLORING OILS, FATS, &c., AND PROCESS OF MAKING THE SAME.

No. 899,879. Specification of Letters Patent. Patented Sept. 29, 1908.

Application filed November 21, 1905. Serial No. 288,376.

*To all whom it may concern:*

Be it known that we, TOMASZ MACHERSKI and EDWARD KOPERSKI, both subjects of the Emperor of Russia, and residents of Brest-Litovsk, Russia, (post-office address Chausse street, Brest-Litovsk,) have invented certain new and useful Improvements in Compositions for Decoloring Oils, Fats, &c., and Processes of Making the Same, of which the following is a specification.

The present improvement consists in a novel composition for decoloring oils, fats, syrups, molasses, varnishes, rosins, petroleum products, alcohol, sugar solutions, etc.

In the use of the new composition, it is necessary only for the operator to pass the liquid to be cleansed through a body containing the new composition, or to have the ingredients of the new composition, either successively or as desired, added to or mixed with the body to be cleansed, and to then filter such body to separate therefrom the cleansing material and the impurities. The ingredients of the new composition may be added singly or in combination. When the latter practice is desired, we may prepare our new composition as follows: 100 parts, by weight, of pulverized bone-black are treated by 50 parts or more of hydrochloric acid (H.CL) at a temperature of about 167° Fahrenheit, and then left to cool. The liquid part is then filtered, and the remaining solid part is washed with water at about 122° Fahrenheit, until all acid parts are removed and the washing liquid becomes quite neutral. By this treatment, all phosphates and carbonates are entirely removed from the bone-black. This purified bone-black, after being dried, is intimately mixed with 1% to 7% of finely powdered zinc (ZN) and with 10% to 40% of graphite, the quantity of these materials depending on the degree of coloring matters to be removed from a given liquid. For decoloring sugar solutions and nutritious or edible oils it is advisable to add also 0.1% to 1% of dry carbonate of sodium. The mixture thus prepared is the new composition of matter designed for decoloring liquids, and according to the experiments we have made it is sufficient to use from 1% to 10% of this mixture for decoloring almost any liquid.

It is to be observed that instead of bone-black other kinds of charcoal can be used, and that in most cases there will be no necessity to treat them with hydrochloric acid; still the admixture of graphite and zinc must be made in about the same proportions.

For a composition to be employed in decoloring fats and oils, we take ½% to 2% of our composition and mix it with 100 parts of oil or liquid fat in an appropriate mixing apparatus at about 122° Fahrenheit and for several hours. The mass is then filtered in filter presses, and the extracted oil is additionally pressed through a sheet of our composition, for which purpose we preferably use cylindrical filters. For treating sugar syrups, molasses and the like, it is almost sufficient to mix a syrup, etc. with our composition in a mixing apparatus at the boiling temperature. It is only to be observed that the density of the syrup solution should not be greater than about 50° to 60° Brix.

We are aware that the use of bone-black for decoloring oils and sugar solutions in general is not new. But the results attained by our composition are by far more favorable, owing to the fact that we use bone-black free from all phosphates and carbonates, and furthermore the action of bone-black is enhanced by addition of very active materials, as zinc and graphite.

Experiments made with our composition in sugar refining have proved that from sugar syrups treated by our composition a perfectly white sugar (rafinade) is obtained, and that even from the II product a white sugar is produced and its purity is greatly enhanced, its glueyness being on the contrary greatly reduced. For this reason the crystallization of sugar in boiling (vacuum) apparatus is more easily attained, with a greater output of crystalline sugar. The treatment with our composition makes it possible to do without the usual filtering through bone-black and also without the use of sulfurous acid, thus insuring a considerable economy of the process. A further advantage of our composition is the possibility of its regeneration.

In fact, if after the treatment with our composition this latter be separated by filtration from the decolored liquid, and the residue well washed and filtered and calcined in a close vessel, the composition thus treated recovers completely its decoloring qualities and can be used for decoloring new quantities of liquid. Thus the loss is reduced to that unavoidably remaining with the particles in the residues of various operations.

The composition remaining after the treatment of oils can be freed from the particles of oil by treating it with benzin or by mechanically pressing off the oil, whereafter the composition is calcined in closed vessels for its regeneration.

The improved process for clarifying and decoloring liquids, may be carried out by the simultaneous reaction of carbon (preferably purified and neutralized powdered charcoal) and zinc powder; the carbon and the zinc may be added together, or separately in such proportion and order desired. Similarly, the graphite, which may sometimes be dispensed with may be added as an original part of the composition, or separately, and in such proportions and at such times as desired. Again, especially when the edible fluids (such as saccharine solution, edible oils, and the like) are to be clarified the carbonate of soda may be added with the rest of the ingredients or separately.

We claim as our invention:

1. A composition for decoloring oils and other liquids, consisting of previously purified bone black mixed with finely powdered zinc.

2. A composition for decoloring oils and other liquids, consisting of an intimate mixture of previously purified bone black, finely powdered zinc and graphite.

3. A composition for decoloring oils and other liquids, consisting of an intimate mixture of previously purified bone black, finely powdered zinc, graphite and dry carbonate of soda.

4. A composition for decoloring oils and other liquids, consisting of an intimate mixture of previously purified and neutral bone-black mixed with finely powdered zinc.

5. The process of making a composition for decoloring oils and other liquids, consisting in mixing bone black with hydrochloric acid, filtering the mixture, neutralizing the remaining solid material and mixing graphite and finely powdered zinc with the neutral body aforesaid.

In testimony whereof, we have signed our names to this specification in the presence of two subscribing witnesses.

TOMASZ MACHERSKI.
EDWARD KOPERSKI.

Witnesses:
H. A. LOVIAGUINE,
N. TSCHENALOFFL.